United States Patent [19]

Bühler et al.

[11] 4,415,494
[45] Nov. 15, 1983

[54] WATER-INSOLUBLE MONOAZO DYESTUFFS, THEIR MANUFACTURE AND THEIR USE

[75] Inventors: Ulrich Bühler, Schöneck; Rudolf Löwenfeld, Dreieich; Uwe Kosubek, Büttelborn; Maria Kallay, Königstein, all of Fed. Rep. of Germany

[73] Assignee: Cassella Aktiengesellschaft, Frankfurt, Fed. Rep. of Germany

[21] Appl. No.: 245,630

[22] Filed: Mar. 19, 1981

[30] Foreign Application Priority Data

Mar. 22, 1980 [DE] Fed. Rep. of Germany ....... 3011178

[51] Int. Cl.³ .................. C07C 107/00; C07C 107/06; C07C 107/08; C09B 29/00
[52] U.S. Cl. .................................................... 260/196
[58] Field of Search ........................................ 260/196

[56] References Cited

U.S. PATENT DOCUMENTS

| | | | |
|---|---|---|---|
| 1,217,042 | 2/1917 | Mensching | 260/196 |
| 2,151,857 | 3/1939 | Manz et al. | 260/205 |
| 2,311,033 | 2/1943 | Dickey | 260/196 X |
| 2,323,314 | 7/1943 | Dickey et al. | 260/199 |
| 2,373,700 | 4/1945 | McNally et al. | 260/205 |
| 3,598,802 | 8/1971 | Weaver et al. | 260/196 |
| 4,054,560 | 10/1977 | Bruno | 260/196 |

FOREIGN PATENT DOCUMENTS

| | | | |
|---|---|---|---|
| 34716 | 9/1981 | European Pat. Off. | 260/196 |
| 589695 | 7/1977 | Fed. Rep. of Germany | 260/196 |
| 3004653 | 8/1981 | Fed. Rep. of Germany | 260/196 |
| 785958 | 8/1935 | France | 260/196 |
| 43-7235353 | 9/1968 | Japan | 260/196 |

*Primary Examiner*—Paul F. Shaver
*Attorney, Agent, or Firm*—Connolly and Hutz

[57] ABSTRACT

Monoazodyestuffs free from water solubilizing moieties and which are useful in dyeing and printing polyester materials, mixtures of polyesters with natural materials or cellulose triacetate materials have the formula

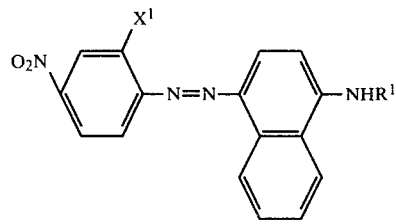

wherein $X^1$ is nitro, cyano or methylsulphonyl and $R^1$ is of the formula

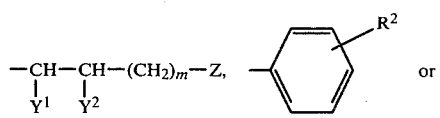

or

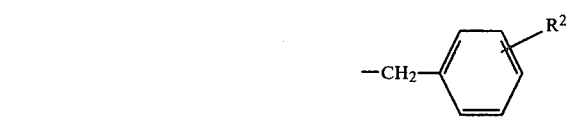

wherein $Y^1$ is hydrogen, methyl or ethyl;

$Y^2$ is hydrogen, hydroxyl, alkanoyloxy having 1 to 4 carbon atoms in the alkanoyl moiety, or alkoxycarbonyloxy having 1 to 4 carbon atoms in the alkyl moiety, and said alkanoyloxy and said alkoxycarbonyloxy are each unsubstituted or substituted by alkoxy having 1 to 4 carbon atoms or phenoxy;

Z is hydrogen, phenyl, cyano, hydroxyl, phenoxy, phenoxy substituted by alkyl having 1 to 4 carbon atoms, phenoxy substituted by alkoxy having 1 to 4 carbon atoms, halogen substituted phenoxy, alkoxycarbonyl having 1 to 4 carbon atoms in the alkoxy, alkoxycarbonyl having 1 to 4 alkoxy carbon atoms substituted by hydroxyl, alkoxycarbonyl having 1 to 4 carbon atoms in the alkoxy moiety substituted by alkoxy having 1 to 4 carbon atoms, phenoxy substituted alkoxycarbonyl having 1 to 4 alkoxy carbon atoms, phenyl substituted alkoxycarbonyl having 1 to 4 alkoxy carbon atoms, alkoxy having 1 to 4 carbon atoms, hydroxy substituted alkoxy having 1 to 4 carbon atoms, cyano substituted alkoxy having 1 to 4 alkoxy carbon atoms, alkoxy of 1 to 4 carbon atoms substituted by alkoxy having 1 to 4 carbon atoms, alkanoyloxy having 1 to 4 carbon atoms, phenoxy alkanoyloxy having 1 to 4 alkanoyl carbon atoms, alkanoyloxy having 1 to 4 carbon atoms substituted by alkoxy having 1 to 4 carbon atoms, alkoxycarbonyloxy having 1 to 4 carbon atoms in the alkyl moiety, alkoxycarbonyloxy having 1 to 4 alkyl carbon atoms substituted by alkoxy having 1 to 4 carbon atoms or phenoxy substituted alkoxycarbonyloxy having 1 to 4 alkyl carbon atoms;

$R^2$ is hydrogen, alkyl having 1 to 4 carbon atoms or alkoxy having 1 to 4 carbon atoms; and m is a number from 0 to 2.

7 Claims, No Drawings

WATER-INSOLUBLE MONOAZO DYESTUFFS, THEIR MANUFACTURE AND THEIR USE

The present invention relates to valuable monoazo dye-stuffs which are free from groups imparting solubility in water and which have the general formula I

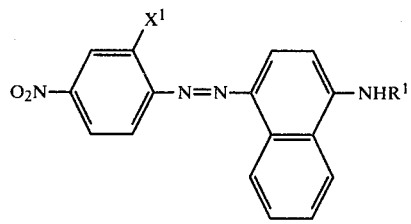
(I)

wherein $X_1$ denotes nitro, cyano or methylsulphonyl and $R^1$ denotes a radical of the formulae Ia, Ib or Ic

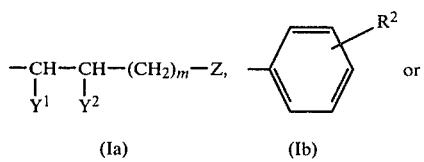 or (Ia)        (Ib)

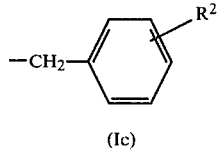

(Ic)

wherein $Y^1$ denotes hydrogen, methyl or ethyl, $Y^2$ denotes hydrogen, hydroxyl, optionally substituted acyloxy or optionally substituted alkoxycarbonyloxy, Z denotes hydrogen, phenyl, cyano, hydoxyl, optionally substituted phenoxy, optionally substituted alkoxycarbonyl, optionally substituted alkoxy, optionally substituted acyloxy or optionally substituted alkoxycarbonyloxy, m denotes a number from 0 to 2 and $R^2$ denotes hydrogen, alkyl having 1 to 4 C atoms or alkoxy having 1 to 4 C atoms, to mixtures of these dyestuffs with monoazo dyestuffs of the general formula II

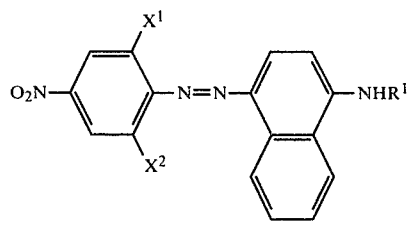
(II)

wherein $X^2$ denotes chlorine or bromine and $X^1$ and $R^1$ have the meanings indicated above, to the manufacture of these dyestuffs by diazotising amines of the formula III

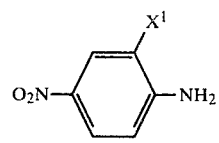
(III)

optionally as a mixture with amines of the formula V

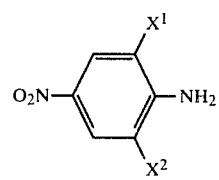
(V)

and coupling with α-naphthylamine derivatives of the formula IV

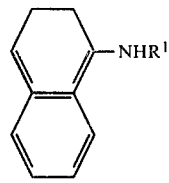
(IV)

and to the use of these dyestuffs for colouring synthetic, hydrophobic fibres.

Dyestuffs containing α-naphthylamine coupling components have already been described in numerous publications. Dye-stuffs in which diazotised 2,4-dinitroaniline, 2-cyano-4-nitroaniline and 2-methylsulphonylaniline have been coupled with α-naphthylamine coupling components are also known, for example from British Pat. No. 1,428,129, German Offenlegungsschrift No. 2,054,685, German Offenlegungsschrift No. 2,709,774, Japanese Pat. No. 7,235,353, U.S. Pat. No. 2,266,142 and U.S. Pat. No. 2,045,324.

However, these known dyestuffs still leave numerous desires of industry unfulfilled, particularly with regard to application, where, for example, defects in build-up capacity, in heat stability, in pH stability and in sensitivity to reduction and/or defects in evenness resulting therefrom manifest themselves, and also with regard to the fastness properties of the dyeings and, not least, the cost of dyeing, bearing in mind the depth of colour. Surprisingly, the dyestuffs of the present invention cater for the requirements of industry to a far larger extent than to those hitherto known.

The dyestuffs according to the invention are monoazo dyestuffs which are free from groups imparting solubility in water and which have the general formula I

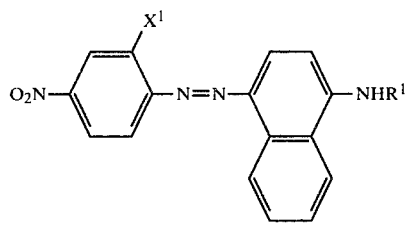
(I)

wherein $X^1$ denotes nitro, cyano or methylsulphonyl and $R^1$ denotes a radical of the formulae Ia, Ib or Ic

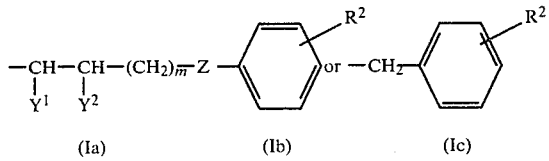

wherein $Y^1$ denotes hydrogen, methyl or ethyl, $Y^2$ denotes hydrogen, hydroxyl or acyloxy which has 1 to 4 C atoms in the acyl group and is optionally substituted by alkoxy having 1 to 4 C atoms or phenoxy; or denotes alkoxycarbonyloxy which has 1 to 4 C atoms in the alkyl group and is optionally substituted by alkoxy having 1 to 4 C atoms or phenoxy, Z denotes hydrogen, phenyl, cyano, hydroxyl or phenoxy which is optionally substituted by alkyl having 1 to 4 C atoms, alkoxy having 1 to 4 C atoms or halogen; or denotes alkoxycarbonyl which has 1 to 4 C atoms in the alkoxy group and is optionally substituted by hydroxyl, alkoxy having 1 to 4 C atoms, phenoxy or phenyl; or denotes alkoxy which has 1 to 4 C atoms and is optionally substituted by hydroxyl, alkoxy having 1 to 4 C atoms, cyano or phenyl; or denotes acyloxy which has 1 to 4 C atoms and is optionally substituted by alkoxy having 1 to 4 C atoms or phenoxy; or denotes alkoxycarbonyloxy which has 1 to 4 C atoms in the alkyl group and is optionally substituted by alkoxy having 1 to 4 C atoms or phenoxy; m denotes a number from 0 to 2 and $R^2$ denotes hydrogen, alkyl having 1 to 4 C atoms or alkoxy having 1 to 4 C atoms.

In this definition, acyloxy or acyl represent alkanoyloxy or alkanoyl, respectively.

Phenoxy groups representing Z can also carry, in the phenyl nucleus, one of the substituents indicated above. This substituent, and also the substituent $R^2$ of the radical

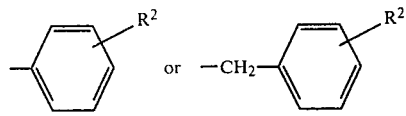

representing $R^1$, can be in either the 2-position, the 3-position or the 4-position, relative to the point of attachment of the phenyl nucleus to the O, N or C atom, respectively. Phenyl or phenoxy groups occurring as substituents in acyloxy representing $Y^2$ or Z, in alkoxycarbonyloxy representing $Y^2$ or Z, in alkoxycarbonyl repesenting Z or in alkoxy representing Z, can, in turn, carry one of the substituents methyl, methoxy or chlorine in the 2-, 3- or 4-position. Examples of optionally substituted acyloxy radicals having 1 to b 4 C atoms, which can be represented by $Y_2$ or Z, are acetoxy, propionoxy, n-butyroxy, i-butyroxy, 2-methoxyacetoxy, 2-ethoxyacetoxy, 2-(n-propoxy)-acetoxy, 2-(i-propoxy)-acetoxy, 2-(n-butoxy)-acetoxy, 2-(i-butoxy)-acetoxy, 2-(t-butoxy)-acetoxy, 2-methyloxypropionoxy, 2-ethoxypropionoxy, 2-(n-propoxy)-propionoxy, 2-(i-propoxy)-propionoxy, 2-(n-butoxy)-propionoxy, 2-(i-butoxy)-propionoxy, 2-(t-butoxy)-propionoxy, 3-methoxypropionoxy, 3-ethoxypropionoxy, 3-(n-propoxy)-propionoxy, 3-(i-propoxy)-propionoxy, 3-(n-butoxy)-propionoxy, 3-(i-butoxy)-propionoxy, 3-(t-butoxy)-propionoxy, 2-methoxy-n-butyroxy, 2-ethoxy-n-butyroxy, 2-(n-propoxy)-n-butyroxy, 2-(i-propoxy)-n-butyroxy, 2-(n-butoxy)-n-butyroxy, 2-(i-butoxy)-n-butyroxy, 2-(t-butoxy)-n-butyroxy, 2-methoxy-i-butyroxy, 2-ethoxy-i-butyroxy, 2-n-propoxy-i-butyroxy, 2-i-propoxy-i-butyroxy, 2-n-butoxy-i-butyroxy, 2-i-butoxyi-butyroxy, 2-phenoxyacetoxy, 2-(2-methylphenoxy)-acetoxy, 2-(3-methylphenoxy)-acetoxy, 2-(4-methylphenoxy)-acetoxy, 2-(4-methoxyphenoxy)-acetoxy, 2-phenoxypropionoxy, 2-(4-methylphenoxy)-propionoxy, 2-(4-methoxyphenoxy)-propionoxy, 3-phenoxypropionoxy, 3-(4-methylphenoxy)-propionoxy, 3-(4-methoxyphenoxy)-propionoxy, 2-phenoxy-n-butyroxy, 2-(4-methylphenoxy)-n-butyroxy, 2-(4-methoxyphenoxy)-n-butyroxy and 2-phenoxy-i-butyroxy.

Examples of optionally substituted alkoxycarbonyl radicals having 1 to 4 C atoms in the alkyl group, which can be represented by $Y^2$ or Z, are methoxycarbonyloxy, ethoxycarbonyloxy, n-propoxycarbonyloxy, i-propoxycarbonyloxy, n-butoxycarbonyloxy, i-butoxycarbonyloxy, t-butoxycarbonyloxy, 2-methoxyethoxycarbonyloxy, 2-ethoxyethoxycarbonyloxy, 2-propoxycarbonyloxy, 2-butoxycarbonyloxy, 3-methoxypropoxycarbonyloxy, 3-ethoxypropoxycarbonyloxy, (methoxy-i-propoxy)-carbonyloxy, (ethoxy-i-propoxy)-carbonyloxy, (propoxy-i-propoxy)-carbonyloxy, (butoxy-i-propoxy)-carbonyloxy, 4-methoxybutoxycarbonyloxy, 4-ethoxybutoxycarbonyloxy, (3-methoxy-n-butoxy)-carbonyloxy, (3-ethoxy-n-butoxy)-carbonyloxy, (3-propoxy-n-butoxy)-carbonyloxy, (3-butoxy-n-butoxy)-carbonyloxy, 2-phenoxyethoxy, (phenoxy-i-propoxy)-carbonyloxy and (3-phenoxy-n-butoxy)-carbonyloxy.

Examples of optionally substituted phenoxy radicals which can be represented by Z, are 2-methylphenoxy, 3-methylphenoxy, 4-methylphenoxy, 4-methyoxyphenoxy, 2-chlorophenoxy, 3-chlorophenoxy or 4-chlorophenoxy.

Examples of optionally substituted alkoxycarbonyl radicals having 1 to 4 C atoms, which can be represented by Z, are methoxycarbonyl, ethoxycarbonyl n-propoxycarbonyl, i-propoxycarbonyl, n-butoxycarbonyl, i-butoxycarbonyl, t-butoxycarbonyl, 2-hydroxyethoxycarbonyl, 2-methoxyethoxycarbonyl, 2-propoxyethoxycarbonyl, 2-butoxyethoxycarbonyl, 2-phenoxyethoxycarbonyl, 2-(4-methylphenoxy)-ethoxycarbonyl, 2-(4-methoxyphenoxy)-ethoxycarbonyl, 3-hydroxypropoxycarbonyl, 3-methoxypropoxycarbonyl, 3-ethoxypropoxycarbonyl, methoxy-i-propoxycarbonyl, ethoxy-i-propoxycarbonyl, phenoxy-i-propoxycarbonyl, 4-hydroxybutoxycarbonyl, 4-methoxybutoxycarbonyl, 4-ethoxybutoxycarbonyl, 3-methoxy-n-butoxycarbonyl, 3-ethoxy-i-butoxycarbonyl, 3-propoxy-i-butoxycarbonyl, 3-butoxy-i-butoxycarbonyl, 3-phenoxy-i-butoxycarbonyl or benzyloxycarbonyl.

Examples of optionally substituted alkoxy groups having 1 to 4 C atoms, which can be represented by Z, are methoxy, ethoxy, propoxy, i-propoxy, butoxy, i-butoxy, tert.-butoxy, 2-hydroxyethoxy, 2-methoxyethoxy, 2-ethoxyethoxy, 2-propoxyethoxy, 2-butoxyethoxy, 3-hydroxypropoxy, 3-methoxypropoxy, 3-ethoxypropoxy, 3-methoxybutoxy, 3-ethoxybutoxy, 4-hydroxybutoxy, 4-methoxybutoxy, 2-acetoxyethoxy, 2-propanoyloxyethoxy or 2-butyrylethoxy.

Preferred dyestuffs are those of the formula I wherein $R^1$ is a radical of the formula Ib, particularly those in which $R^2$ is hydrogen, methyl, ethyl, i-propyl, methoxy, ethoxy, propoxy, i-propoxy, butoxy or i-butoxy.

If the following aspects are borne in mind, the particularly advantageous individual dyestuffs are to be found in the group of the dyestuffs, according to the invention, of the formula I in which $R^1$ is a radical of the formula Ia.

Preferred acyloxy radicals represented by $Y^2$ or Z are alkanoyloxy radicals which have 2 to 4 C atoms and are substituted by methoxy or ethoxy, particularly those which are unsubstituted. Particular interest also attaches to a phenoxyacetyl radical represented by $Y^2$ or Z. Preferred alkoxycarbonyloxy radicals represented by $Y^2$ or Z are substituted by methoxy or ethoxy; in particular, however, they are unsubstituted. The phenoxyethoxycarbonyl radical is also of particular interest as an alkoxycarbonyloxy radical.

Preferred alkoxycarbonyl radicals represented by Z are those which do not carry any further substituents in the alkoxy group, but also those which are substituted by alkoxy having 1 to 4 C atoms, particularly methoxy, ethoxy or propoxy, or are substituted by hydroxyl.

Preferred alkoxy groups represented by Z are those which are unsubstituted and have 1 to 4 C atoms or alkoxy groups which are substituted by hydroxyl, alkoxy having 1 to 4, particularly 1 or 2, C atoms, acyloxy having 1 to 4, particularly 1 or 2, C atoms or phenoxy, and have 2 to 4 C atoms.

Within the group of dyestuffs according to the invention, in which $R^1$ is a radical of the formula Ia, dyestuffs which are also very advantageous are those in which $Y^2$ and Z are hydrogen and those in which $Y^1$ and $Y^2$ denote hydrogen and Z denotes hydroxyl, alkoxy which has 1 to 4 C atoms and is optionally substituted as indicated above, phenoxy which is optionally substituted as indicated above, acyloxy which has 1 to 4 C atoms and is optionally substituted as indicated above or alkoxycarbonyloxy which is optionally substituted as indicated above.

The number m, which can be between 0 and 2, is advantageously 0, if $Y^1$ and $Y^2$ independently of one another denote hydrogen or methyl and Z denotes cyano, alkoxycarbonyl which has 1 to 4 C atoms in the alkoxy group and is optionally substituted as indicated above or phenyl, m is advantageously 1 if $Y^1$ denotes hydrogen, $Y^2$ denotes hydroxyl and Z denotes alkoxy which has 1 to 4 C atoms and is optionally substituted as indicated above, cycloalkoxy having 5 or 6 C atoms or phenoxy which is optionally substituted as indicated above, or if $Y^1$ denotes hydrogen and $Y^2$ and Z denote acyloxy which is optionally substituted as indicated above, alkoxycarbonyloxy which is optionally substituted as indicated above or hydroxyl.

Dyestuffs according to the invention which are also particuarly advantageous are those in which $R^1$ is a radical of the formula Ia and, if $Y^1$ and $Y^2$ are hydrogen or methyl, m is a number from 0 to 2 and Z is hydrogen or, if one of the substituents $Y^1$ and $Y^2$ is hydrogen and the other is methyl, m is zero and Z is phenyl, or, if $Y^1$ and $Y^2$ are hydrogen, m is zero and Z is cyano or optionally substituted alkoxycarbonyl having 1 to 4 C atoms, or, if $Y^1$ is hydrogen, m is the number 1 and $Y^2$ is hydroxyl and Z is hydroxyl, optionally substituted alkoxy having 1 to 4 C atoms or phenoxy, or, if $Y^1$ is hydrogen, m is the number 1 and $Y^2$ and Z are optionally substituted alkanoyloxy having 1 to 4 C atoms or $C_1$ to $C_4$ alkoxyalkanoyloxy having a total of 2 to 8 C atoms.

Dyestuffs of the formula I which are also preferred are those wherein $R^1$ is a radical of the formula Ic, particularly those in which $R^2$ is hydrogen, methyl, methoxy, ethoxy, propoxy or butoxy. Dyestuffs, according to the invention, of the formula I which are particularly preferred are those which have several advantageous or preferred characteristics. Mixtures of monoazo dyestuffs, according to the invention, of the general formula I, with monoazo dyestuffs of the general formula II

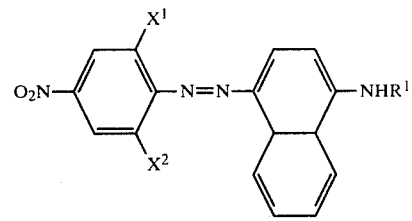

wherein $X^2$ denotes chlorine or bromine and $X^1$ and $R^1$ have the meanings indicated in Claim 1, are particularly advantageous technically in relation to dyestuff yield, affinity and fastness of dyeings and/or prints. Such dyestuff mixtures according to the invention contain 10 to 90, preferably 30 to 70, % by weight of dyestuffs of the formula I and 90 to 10, preferably 70 to 30, % by weight of dyestuffs of the formula II.

The dyestuffs of the formula II and their manufacture are known. (Compare British Pat. No. 985,254, German Auslegeschrift No. 2,510,112, German Offenlegungsschrift No. 2,319,709, German Offenlegungsschrift No. 2,116,315, French Pat. No. 792,450, German Offenlegungsschrift No. 1,963,590, Japanese Pat. No. 7,235,353 and German Offenlegungsschrift No. 1,544,396).

The dyestuffs, according to the invention, of the formula I are prepared by diazotising an amine of the general formula III $$\text{O}_2\text{N}-\underset{}{\overset{X^1}{\bigcirc}}-\text{NH}_2 \qquad (III)$$

wherein $X^1$ has the meanings mentioned above, and coupling the product with a coupling component of the general formula IV $$\bigcirc\!\bigcirc-\text{NH}-R^1 \qquad (IV)$$

wherein $R^1$ has the meaning mentioned above. The diazotisation of the amine of the formula III is effected in a manner which is in itself known by the action of nitrous acid or compounds which split off nitrous acid. For example, the amines can be dissolved in sulphuric acid, hydrochloric acid or lower aliphatic carboxylic acids, such as, for example, acetic acid or propionic acid, and can be diazotised by adding nitrosylsulphuric acid or sodium nitrite at 0° to 60° C. The coupling is carried out at temperatures from 0° to 30° C. in an acid aqueous medium, in a lower aliphatic carboxylic acid, such as, for example, acetic acid, which is appropriately diluted with water, or in a mixture of water and an alcohol which is sparingly soluble in water, such as n-butanol or i-butanol. The temperature range from 0° to 15° C. is preferred in this connection. In order to complete the coupling reaction, it can be appropriate to buffer the pH value of the coupling batch at a value of 3 to 6 towards the end of the reaction by adding alkalis, such as, for example, sodium acetate. With regard to the formation of the disperse dyestuffs or with regard to their dyestuff yield, it can be advantageous to couple a mixture of diazotised amines of the formula III with a coupling component of the formula IV or a diazotised amine of the formula III with a mixture of coupling components of the general formula IV or to mix two or more individual dyestuffs which have been prepared by separate routes.

If it is desired to prepare mixtures of dyestuffs, according to the invention, of the formula I with dyestuffs of the formula II, it is appropriate to diazotise mixtures of amines of the general formulae III and V

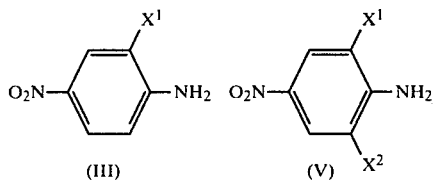

wherein $X^1$ and $X^2$ have the meanings mentioned above, and to couple the products with a coupling component of the formula IV

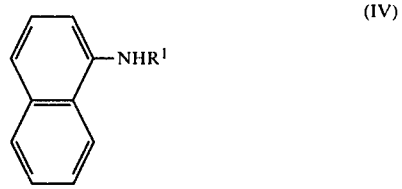

wherein $R^1$ has the meaning mentioned above. The dyestuffs according to the invention are particularly suitable for dyeing and printing hydrophobic fibre materials, such as, for example, polyamide, cellulose 2½-acetate, cellulose triacetate and particularly polyester materials, for example polyethylene glycol terephthalate. They then produce, using customary dyeing and printing processes, deep, red-violet to black dyeings and prints which have very good fastness properties, particularly very good fastness to light, fastness to pleating by dry heat and fastness to fixing by dry heat, and a very good behaviour when finished with synthetic resins together with a very good behaviour in regard to thermomigration.

The dyeing of the said fibres, which can be present on their own or as a mixture with other types of fibres, such as, for example, cotton, regenerated cellulose fibres or wool, by means of the dyestuffs according to the invention is appropriately effected from an aqueous suspension, in the presence of carriers at about 80°-110° C., in the absence of carriers at about 110°-140° C. and, using the so-called thermofixing process, at about 180°-230° C. The printing of the said materials can be carried out by a procedure in which the goods which have been printed with the new dyestuffs are steamed, in the presence of a carrier at temperatures of about 80°-110° C., or, in the absence of the carrier, at about 110°-140° C., or are treated in accordance with the so-called thermofixing process at about 180°-230° C.

The dyestuffs according to the invention are also suitable for dyeing the hydrophobic materials listed above from organic solvents and for mass coloration.

The dyestuffs, according to the invention, of the formula I and also, in particular, their mixtures with one another and with dyestuffs of the formula II, when applied by one of the processes indicated above, are, surprisingly, considerably superior to the comparable dyestuffs hitherto known in respect of depth of colour, fastness to light, fastness to sublimation, pH stability, resistance to alkalis, resistance to reduction, heat resistance and build-up capacity and affinity.

The following illustrative embodiments illustrate the preparation of the dyestuffs and mixtures of dyestuffs according to the invention and one possible means of using them.

EXAMPLE 1

18.3 g of 2,4-dinitroaniline are diazotised at 15° C. in glacial acetic acid by adding 34.2 g of nitrosylsulphuric acid and the product is coupled at 0°-5° C. with a suspension of 23.0 g of N-phenyl-α-naphthylamine in 200 ml of n-butanol and 400 ml of water. After 3 hours the dyestuff which has been formed is filtered off, washed with n-butanol and water and dried under reduced pressure.

This gives 35.3 g of the dyestuff of the formula

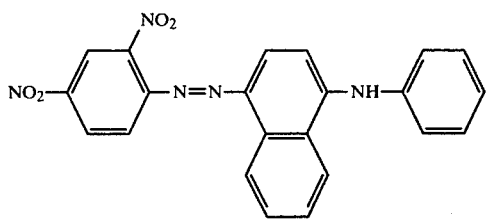

which melts at 215°-20° C. and which dyes polyester in black-brown shades having very good coloristic fastness properties.

EXAMPLE 2

If 18.3 g of 2,4-dinitroaniline and 21.8 g of 2,4-dinitro-6-chloroaniline are diazotised by adding 68.4 g of nitrosylsulphuric acid, the product coupled with 46.0 g of N-phenyl-α-naphthylamine and the resulting dyestuff isolated, analogously to Example 1, 34.6 g of a mixture are obtained which consists of 50% of the dyestuff of Example 1 and 50% of the dyestuff of the formula

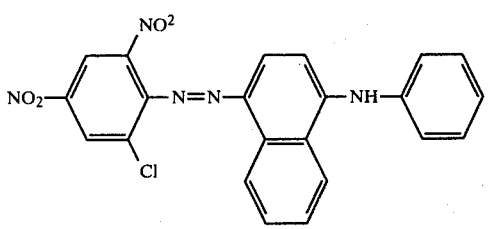

and which dyes polyester in black shades having very good coloristic fastness properties.

EXAMPLE 3

A fabric made from polyethylene glycol terephthalate is padded at 30° C. on a padder with a liquor containing 30.0 g of the dyestuff of Example 2, brought into a finely divided state, 1.0 g of polyacrylamide having a K value of 120 and 0.5 g of a polyglycol ether of oleyl alcohol and 968.5 g of water. After drying, the goods are fixed for 60 seconds at 210° C. in a thermofixing frame. Subsequent rinsing, reductive after-treatment with a 0.2% strength alkaline solution of soidum dithionite for 15 minutes at 70° to 80° C., rinsing and drying gives a black dyeing having very good coloristic properties, in particular very good fastness to light and fastness to thermofixing.

Dyestuffs and mixtures of dyestuffs, according to the invention, of the tables which follow, can be prepared analogously to Examples 1 and 2. They also dye hydrophobic fibres in full brown to black shades of excellent fastness.

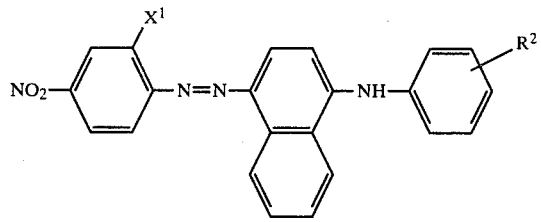

| No. | $X^1$ | $R^2$ | Shade on polyester | No. | $X^1$ | $R^2$ | Shade on polyester |
|---|---|---|---|---|---|---|---|
| 3 | CN | H | blue-violet | 9 | $NO_2$ | $4-CH(CH_3)_2$ | black-brown |
| 4 | $SO_2CH_3$ | H | " | 10 | CN | $4-CH(CH_3)_2$ | black-brown |
| 5 | $NO_2$ | $4-CH_3$ | black-brown | 11 | CN | $4-OCH_3$ | reddish-tinged blue |
| 6 | CN | $4-CH_3$ | blue-violet | 12 | CN | $4-OC_4H_9$ | reddish-tinged blue |
| 7 | $NO_2$ | $4-C_2H_5$ | black-brown | 13 | $NO_2$ | $4-OC_2H_5$ | black-brown |
| 8 | $SO_2CH_3$ | $4-C_2H_5$ | blue-violet | | | | |

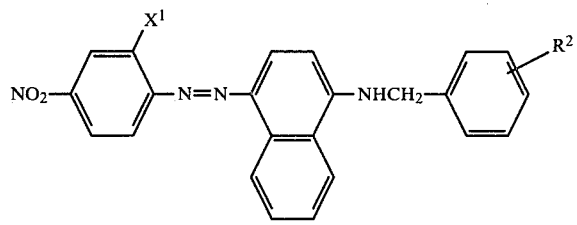

| No. | $X^1$ | $R^2$ | Shade on polyester | No. | $X^1$ | $R^2$ | Shade on polyester |
|---|---|---|---|---|---|---|---|
| 14 | CN | H | blue-violet | 17 | $NO_2$ | $3-CH_3$ | blue-violet |
| 15 | $NO_2$ | H | " | 18 | CN | $4-CH_3$ | blue |
| 16 | $SO_2CH_3$ | H | " | | | | |

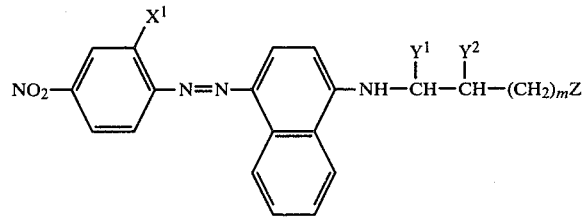

| No. | $X^1$ | $Y^1$ | $Y^2$ | m | Z | Shade on polyester |
|---|---|---|---|---|---|---|
| 19 | $NO_2$ | H | OH | 1 | OH | reddish-tinged navy-blue |
| 20 | " | " | " | " | $OC_2H_5$ | reddish-tinged navy-blue |
| 21 | " | " | " | " | $O-i-C_3H_7$ | reddish-tinged navy-blue |
| 22 | CN | " | " | " | $O-n-C_4H_9$ | reddish-tinged navy-blue |
| 23 | $SO_2CH_3$ | " | " | " | $O(CH_2)_2OH$ | reddish-tinged navy-blue |
| 24 | " | " | " | " | $O(CH_2)_2OCH_3$ | reddish-tinged navy-blue |
| 25 | " | " | " | " | $O(CH_2)_2OC_3H_7$ | reddish-tinged navy-blue |
| 26 | $NO_2$ | " | " | " | $O(CH_2)_4OH$ | reddish-tinged navy-blue |
| 27 | " | " | " | " | $O(CH_2)_2OC_2H_5$ | reddish-tinged navy-blue |
| 28 | " | " | " | " | $OC_6H_5$ | blue-violet |

-continued

| | | | | | | |
|---|---|---|---|---|---|---|
| 29 | " | " | " | " | OC₆H₄—4-CH(CH₃)₂ | blue-violet |
| 30 | CN | " | " | " | OC₆H₄—4-OCH₃ | blue-violet |
| 31 | " | " | " | " | OC₆H₄—3-Cl | blue-violet |
| 32 | CN | H | OCOCH₃ | 1 | OCOCH₃ | violet |
| 33 | " | " | OCOC₃H₇ | " | OCOC₃H₇ | violet |
| 34 | NO₂ | " | OCOCH₂OCH₃ | " | OCOCH₂OCH₃ | violet |
| 35 | " | " | OCOC₂H₅ | " | O(CH₂)₂OCOC₂H₅ | violet |
| 36 | " | " | OCOCH₃ | " | O(CH₂)₃OCOCH₃ | violet |
| 37 | SO₂CH₃ | " | OCOi-C₃H₇ | " | O(CH₂)₄OCO—i-C₃H₇ | violet |
| 38 | NO₂ | " | OCOOC₂H₅ | 1 | OCOOC₂H₅ | reddish-tinged navy-blue |
| 39 | " | " | OCOOC₄H₉ | 1 | OCOOC₄H₉ | reddish-tinged navy-blue |
| 40 | " | " | OCOO(CH₂)₂OCH₃ | " | OCOO(CH₂)₂OCH₂ | reddish-tinged navy-blue |
| 41 | " | " | OCOOC₆H₅ | " | OCOOC₆H₅ | reddish-tinged navy-blue |
| 42 | CN | " | OCOOCH₃ | " | O(CH₂)₂OCOOCH₃ | reddish-tinged navy-blue |
| 43 | " | " | OCOOC₆H₅ | " | O(CH₂)₂OCOOC₆H₅ | reddish-tinged navy-blue |
| 44 | SO₂CH₃ | " | OCOOC₃H₇ | " | O(CH₂)₄OCOOC₃H₇ | reddish-tinged navy-blue |
| 45 | NO₂ | " | H | 0 | OH | reddish-tinged navy-blue |
| 46 | " | " | " | " | OCH₃ | reddish-tinged navy-blue |
| 47 | CN | " | " | " | O—n-C₃H₇ | reddish-tinged navy-blue |
| 48 | NO₂ | " | " | " | O—i-C₄H₉ | reddish-tinged navy-blue |
| 49 | " | " | " | " | O(CH₂)₂OH | reddish-tinged navy-blue |
| 50 | " | " | " | " | O(CH₂)₂OC₂H₅ | reddish-tinged navy-blue |
| 51 | " | " | " | " | O(CH₂)₃O—t-C₄H₉ | reddish-tinged navy-blue |
| 52 | " | " | " | " | O(CH₂)₄OCH₃ | reddish-tinged navy-blue |
| 53 | CN | " | " | " | OC₆H₅ | reddish-tinged navy-blue |
| 54 | " | " | " | " | OC₆H₄—3-CH₃ | reddish-tinged navy-blue |
| 55 | " | " | " | " | O(CH₂)₂OC₆H₅ | reddish-tinged navy-blue |
| 56 | SO₂CH₃ | " | " | " | O(CH₂)₄OC₆H₅ | reddish-tinged navy-blue |
| 57 | " | " | " | 1 | OC₄H₉ | reddish-tinged navy-blue |
| 58 | " | " | " | 1 | OC₆H₅ | reddish-tinged navy-blue |
| 59 | " | " | " | 2 | OC₂H₅ | reddish-tinged navy-blue |
| 60 | SO₂CH₃ | H | H | 2 | O(CH₂)₂OCH₃ | reddish-tinged navy-blue |
| 61 | " | " | " | " | OC₆H₄—4-C₂H₅ | reddish-tinged navy-blue |
| 62 | NO₂ | H | H | 0 | OCOCH₃ | blue-violet |
| 63 | " | " | " | " | OCOC₂H₅ | blue-violet |
| 64 | CN | " | " | " | OCO—i-C₃H₇ | blue-violet |
| 65 | " | " | " | " | OCOCH₂OC₂H₅ | blue-violet |
| 66 | " | " | " | " | OCOCH₂Oi-C₄H₉ | blue-violet |
| 67 | " | " | " | " | OCOCH(OCH₃)CH₃ | blue-violet |
| 68 | " | " | " | " | OCOCH(OC₄H₉)CH₃ | blue-violet |
| 69 | NO₂ | " | " | " | OCOCH(OC₂H₅)C₂H₅ | blue-violet |
| 70 | " | " | " | " | OCOC(C₃H₇)(CH₃)₂ | blue-violet |
| 71 | " | " | " | " | OCOCH₂OC₆H₅ | blue-violet |
| 72 | " | " | " | " | OCOCH₂(OC₆H₄—2-CH₃)CH₃ | blue-violet |
| 73 | SO₂CH₃ | " | " | " | OCO(CH₂)₂OCH₃ | blue-violet |
| 74 | " | " | " | " | OCO(CH₂)₂O—i-C₄H₉ | blue-violet |
| 75 | " | " | " | " | OCO(CH₂)₂OC₆H₅ | blue-violet |
| 76 | NO₂ | " | " | 1 | OCOCH₃ | reddish-tinged navy-blue |
| 77 | " | " | " | 1 | OCOCH₂OC₂H₅ | reddish-tinged navy-blue |
| 78 | " | " | " | 2 | OCOC₂H₅ | reddish-tinged navy-blue |
| 79 | " | " | " | " | OCO—i-C₃H₇ | reddish-tinged navy-blue |
| 80 | " | " | " | " | OCOCH₂OC₆H₅ | reddish-tinged navy-blue |
| 81 | SO₂CH₃ | " | " | " | OCO(CH₂)₂OCH₃ | reddish-tinged |

| # | | | | | | |
|---|---|---|---|---|---|---|
| 82 | " | " | " | 0 | OCOOC$_2$H$_5$ | navy-blue reddish-tinged |
| 83 | CN | " | " | 0 | OCOO—i-C$_5$H$_7$ | navy-blue reddish-tinged |
| 84 | " | " | " | 0 | OCOO(CH$_2$)$_2$OC$_2$H$_5$ | navy-blue reddish-tinged |
| 85 | " | " | " | 0 | OCOOC$_6$H$_5$ | navy-blue reddish-tinged |
| 86 | NO$_2$ | " | " | 1 | OCOOCH$_3$ | navy-blue reddish-tinged |
| 87 | " | " | " | 2 | OCOO(CH$_2$)$_2$OCH$_3$ | navy-blue reddish-tinged |
| 88 | NO$_2$ | H | H | 0 | COOCH$_3$ | bluish-tinged violet |
| 89 | CN | H | H | 0 | COOC$_3$H$_7$ | bluish-tinged violet |
| 90 | SO$_2$CH$_3$ | " | " | 0 | COOiC$_4$H$_9$ | bluish-tinged violet |
| 91 | NO$_2$ | " | " | " | COO(CH$_2$)$_2$OH | bluish-tinged violet |
| 92 | " | " | " | " | COO(CH$_2$)$_2$OC$_2$H$_5$ | bluish-tinged violet |
| 93 | CN | " | " | " | COO(CH$_2$)$_3$OC$_2$H$_5$ | bluish-tinged violet |
| 94 | NO$_2$ | " | " | " | COOCH(CH$_3$)CH$_2$OCH$_3$ | bluish-tinged violet |
| 95 | CN | " | " | " | COOCH(CH$_3$)CH$_2$OC$_3$H$_7$ | bluish-tinged violet |
| 96 | NO$_2$ | " | " | " | COO(CH$_2$)$_4$OCH$_3$ | bluish-tinged violet |
| 97 | NO$_2$ | " | " | " | COO(CH$_2$)$_2$CH(CH$_3$)OC$_4$H$_9$ | bluish-tinged violet |
| 98 | " | " | " | " | COO(CH$_2$)$_2$OC$_6$H$_5$ | bluish-tinged violet |
| 99 | CN | " | " | " | COOCH(CH$_3$)CH$_2$OC$_6$H$_5$ | bluish-tinged violet |
| 100 | SO$_2$CH$_3$ | " | " | " | COO(CH$_2$)$_2$CH(CH$_3$)OC$_6$H$_5$ | bluish-tinged violet |
| 101 | NO$_2$ | " | " | " | COOCH$_2$C$_6$H$_5$ | bluish-tinged violet |
| 102 | CN | CH$_3$ | H | 0 | COOC$_2$H$_5$ | violet |
| 103 | " | " | " | " | COOC$_4$H$_9$ | violet |
| 104 | " | " | " | " | COO(CH$_2$)$_2$OCH$_3$ | violet |
| 105 | " | " | " | " | COO(CH$_2$)$_2$OC$_6$H$_5$ | violet |
| 106 | NO$_2$ | " | " | " | COO(CH$_2$)$_4$OC$_3$H$_7$ | violet |
| 107 | " | " | " | " | COOCH(CH$_3$)CH$_2$OC$_2$H$_5$ | violet |
| 108 | " | " | " | " | COO(CH$_2$)$_2$(CH$_3$)CHOC$_4$H$_9$ | violet |
| 109 | " | C$_2$H$_5$ | " | " | COOC$_3$H$_7$ | violet |
| 110 | SO$_2$CH$_3$ | " | " | " | COO(CH$_2$)$_2$OC$_3$H$_7$ | violet |
| 111 | NO$_2$ | H | H | 0 | C$_6$H$_5$ | reddish-tinged navy-blue |
| 112 | CN | " | " | " | C$_6$H$_5$ | blue-violet |
| 113 | SO$_2$CH$_3$ | " | " | " | C$_6$H$_4$—4-C$_2$H$_5$ | blue-violet |
| 114 | NO$_2$ | CH$_3$ | " | " | C$_6$H$_5$ | blue-violet |
| 115 | NO$_2$ | H | H | 0 | CN | violet |
| 116 | CN | " | " | " | CN | violet |
| 117 | SO$_2$CH$_3$ | CH$_3$ | " | " | CN | violet |
| 118 | NO$_2$ | H | OH | 0 | H | |
| 119 | NO$_2$ | " | OCH$_3$ | " | " | reddish-tinged navy-blue |
| 120 | CN | " | OC$_3$H$_7$ | " | " | reddish-tinged navy-blue |
| 121 | NO$_2$ | " | O(CH$_2$)$_2$OH | " | " | reddish-tinged navy-blue |
| 122 | " | " | OC$_6$H$_5$ | " | " | bluish-tinged violet |
| 123 | " | " | OCOCH$_3$ | " | " | bluish-tinged violet |
| 124 | CN | " | OCOCH$_2$OC$_2$H$_5$ | " | " | bluish-tinged violet |
| 125 | SO$_2$CH$_3$ | " | OCO(CH$_2$)$_2$OCH$_3$ | " | " | bluish-tinged violet |
| 126 | " | " | OCOOCH$_3$ | " | " | reddish-tinged navy-blue |
| 127 | " | " | OCOO(CH$_2$)$_2$OCH$_3$ | " | " | reddish-tinged navy-blue |
| 128 | CN | CH$_3$ | OH | 0 | H | reddish-tinged navy-blue |
| 129 | " | " | OC$_2$H$_5$ | " | " | reddish-tinged navy-blue |
| 130 | NO$_2$ | " | O(CH$_2$)$_2$OCH$_3$ | " | " | reddish-tinged |

-continued

| | | | | | | |
|---|---|---|---|---|---|---|
| 131 | NO2 | " | OCOC2H5 | " " | | navy-blue bluish-tinged violet |
| 132 | SO2CH3 | " | OCOCH2OC4H9 | " " | | bluish-tinged violet |
| 133 | NO2 | " | OCOOC2H5 | " " | | bluish-tinged violet |
| 134 | " | " | OC6H5 | " " | | bluish-tinged violet |
| 135 | NO2 | H | H | 0 | H | reddish-tinged navy-blue |
| 136 | CN | " | " | 1 | " | reddish-tinged navy-blue |
| 137 | " | " | " | 1 | " | reddish-tinged navy-blue |
| 138 | CN | " | " | 2 | " | reddish-tinged navy-blue |
| 139 | SO2CH3 | " | " | 2 | " | reddish-tinged navy-blue |
| 140 | NO2 | CH3 | H | 0 | H | reddish-tinged navy-blue |
| 141 | " | " | " | 0 | " | reddish-tinged navy-blue |
| 142 | " | " | " | 1 | " | reddish-tinged navy-blue |
| 143 | CN | " | " | 1 | " | reddish-tinged navy-blue |
| 144 | SO2CH3 | " | " | 1 | " | reddish-tinged navy-blue |

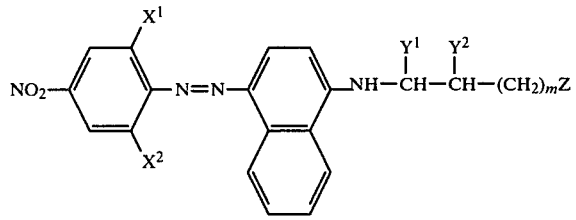

| No. | X¹ | X² | Y¹ | Y² | m | Z | % | Shade on polyester |
|---|---|---|---|---|---|---|---|---|
| 145 | NO2 | H | H | OH | 1 | OC2H5 | 50 | reddish-tinged black |
| | " | Cl | " | " | " | " | 50 | |
| 146 | NO2 | H | H | OH | 1 | OC6H5 | 50 | reddish-tinged black |
| | NO2 | Br | " | " | " | " | 50 | |
| 147 | CN | H | H | OH | 1 | O(CH2)2OCH3 | 70 | reddish-tinged black |
| | CN | Cl | H | OH | 1 | " | 30 | |
| 148 | NO2 | H | H | H | 0 | OC6H5 | 60 | reddish-tinged black |
| | NO2 | " | " | " | " | " | 40 | |
| 149 | NO2 | H | H | H | 0 | O(CH2)2OH | 50 | reddish-tinged black |
| | NO2 | Br | " | " | " | " | 50 | |
| 150 | CN | H | H | H | 0 | C6H5 | 33⅓ | reddish-tinged black |
| | NO2 | Br | " | " | " | " | 33⅓ | |
| | NO2 | Cl | " | " | " | " | 33⅓ | |
| 151 | CN | H | H | H | 0 | C6H5 | 33⅓ | navy-blue |
| | NO2 | " | " | " | " | " | 33⅓ | navy-blue |
| | SO2CH3 | " | " | " | " | " | 33⅓ | navy-blue |
| 152 | NO2 | H | H | H | 0 | CN | 50 | reddish-tinged black |
| | NO2 | Cl | " | " | " | " | 50 | |
| 153 | NO2 | H | CH3 | H | 1 | H | 40 | reddish-tinged black |
| | NO2 | Br | " | " | " | " | 60 | |
| 154 | NO2 | H | CH3 | H | 1 | H | 70 | reddish-tinged black |
| | CN | H | " | " | " | " | 30 | |
| 155 | NO2 | H | H | H | 0 | COOC2H5 | 80 | reddish-tinged black |
| | NO2 | Cl | " | " | " | COOC2H5 | 20 | |

What is claimed:
1. Monoazo dyestuff free from moieties imparting solubility in water and having the formula

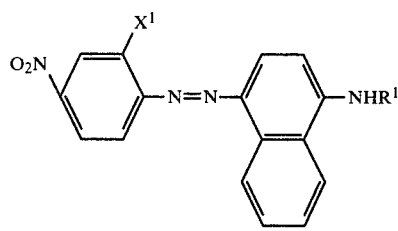

wherein $X^1$ is nitro, cyano or methylsulphonyl and $R^1$ is of the formula

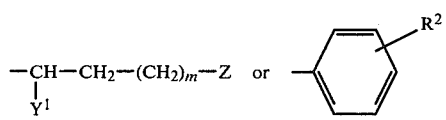

wherein $Y^1$ is hydrogen, methyl or ethyl;

1 Z is phenyl, cyano, phenoxy, phenoxy substituted by alkyl having 1 to 4 carbon atoms, phenoxy substituted by alkoxy having 1 to 4 carbon atoms, halogen substituted phenoxy, alkoxy having 1 to 4 carbon atoms, cyano substituted alkoxy having 1 to 4 alkoxy carbon atoms, alkoxy of 1 to 4 carbon atoms substituted by alkoxy having 1 to 4 carbon atoms, $R^2$ is hydrogen, alkyl having 1 to 4 carbon atoms or alkoxy having 1 to 4 carbon atoms; and m is a number from 0 to 2.

2. Monoazo dyestuff according to claim 1 wherein $R^1$ is

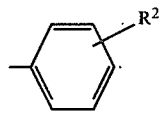

3. Monoazo dyestuff according to claim 1 wherein $Y^1$ is hydrogen; Z is unsubstiuted or substituted alkoxy having 1 to 4 carbon atoms, or unsubstituted or substituted phenoxy; and m is 1.

4. A mixture of monoazo dyestuff comprising a first dyestuff according to claim 1 mixed with a second monoazo dyestuff of the formula

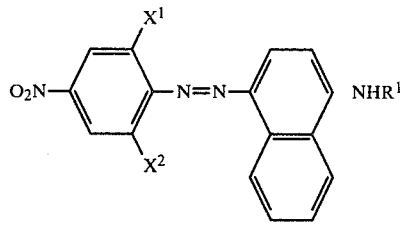

wherein $X^2$ is chloro or bromo.

5. A mixture of dyestuffs according to claim 4 containing 10 to 90% by weight of said first dyestuff.

6. The process for the manufacture of a mixture of monoazo dyestuffs according to claim 5 which comprises diazotizing a mixture of amines of the general formula

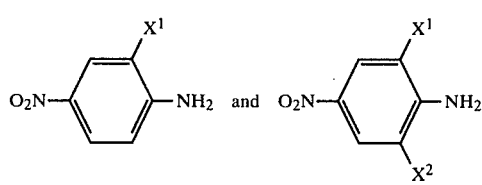

and coupling the diazotized amine mixture with a coupling component of the formula

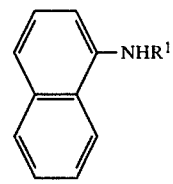

7. The process for the manufacture of monoazo dyestuff according to claim 1 which comprises diazotizing an amine of the formula

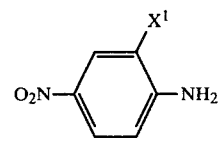

and coupling the diazotized amine with a coupling component of the formula

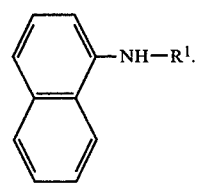

* * * * *